Figure 1:
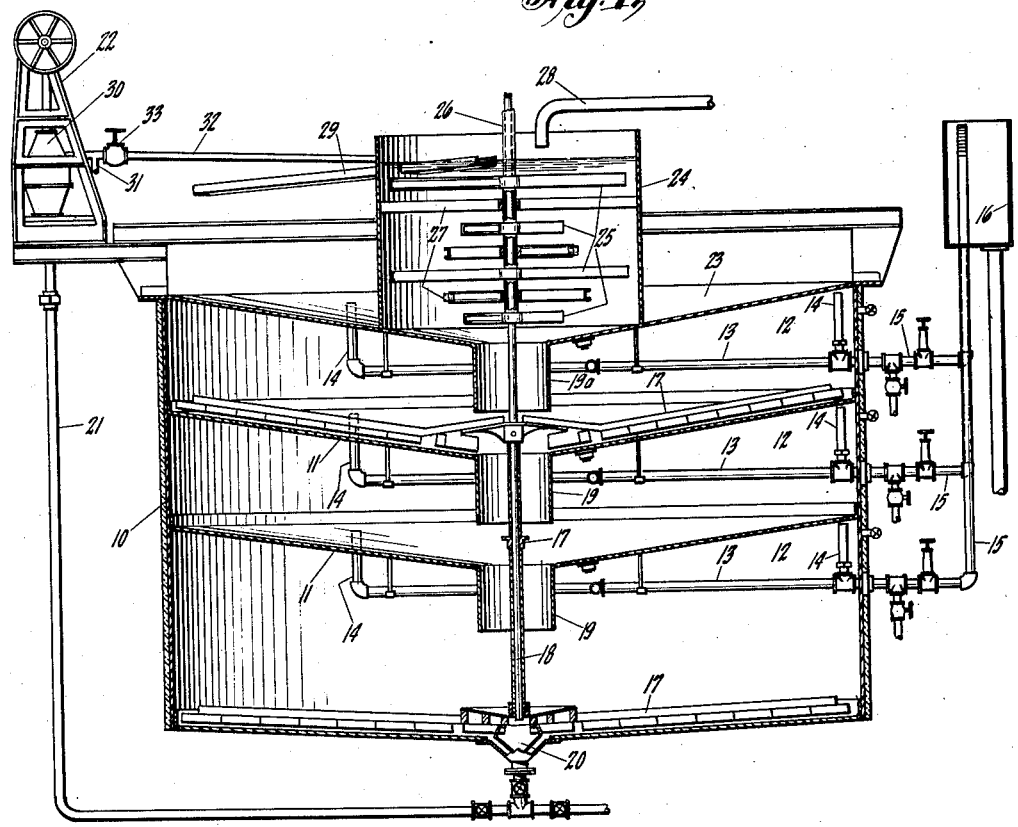

April 1, 1930.  A. W. BULL  1,752,781
DEFECATION OF SUGAR JUICE
Filed April 26, 1927

INVENTOR
Arthur W. Bull,
BY Geo. G. Hyde
His Attorney

Patented Apr. 1, 1930

1,752,781

UNITED STATES PATENT OFFICE

ARTHUR W. BULL, OF NEW YORK, N. Y., ASSIGNOR TO THE DORR COMPANY, OF NEW YORK, N. Y., A CORPORATION OF DELAWARE

DEFECATION OF SUGAR JUICE

Application filed April 26, 1927. Serial No. 186,634.

This invention pertains to the manufacture of sugar and is especially directed to improvements in the defecation of the juice. While it is applicable to the manufacture of sugar either from beets or cane, it will be generally described with reference to the latter.

According to present practice in the manufacture of cane sugar the juice as it comes from the rolls is treated with lime and other reagents, and is heated, the various impurities being precipitated. The resulting solids together with floating fibres and the like are removed in a sedimentation tank, in which the floating material rises to the surface as scum, and the heavier solids settle as a mud, leaving the clear juice in the middle. Various efficient methods of operating such tanks continuously are well known, the object being to produce a juice that is substantially free from any suspended solids.

In this defecation operation the solids formed chemically by the reagents, together with albumin coagulated by the heat, tend to form large flocs which settle promptly and rapidly, thereby removing readily from the juice a great majority of the settleable solids. However, the very rapidity with which the flocs settle tends to leave in suspension a residuum of fine solids which are too disperse to form flocs and which therefore settle quite slowly. This condition requires the use of settling tanks of sufficient size to remove the finer solids, or else demands additional filtration or other special treatment.

The general object of this invention is to control the sedimentation process in such a way that substantially all of the settleable solids will be aggregated into flocs, and will be removed with corresponding rapidity by the settlement of the flocs. This is accomplished by employing carefully regulated agitation which will be sufficient to prevent the settling of the flocs to any great extent; since it has been found that for some reason as yet unknown, after the flocs have been broken up it is impossible to reproduce them of the same size as those originally formed. By maintaining an even distribution of the forming flocs throughout the juice all of the fine solids have an opportunity to attach themselves to the flocs; and after a sufficient period of agitation the juice is run into a settling tank where the flocs settle out rapidly, leaving a clear supernatant juice.

It should be noted that while the agitation of the juice with reagents for defecating purposes is not new, such agitation heretofore has been carried on simply for the purpose of assuring complete mixing of the reagent with the juice, without considering the effect on floc formation. Such mixing would therefore be inadequate to produce the substantially complete accumulation of the solids in flocs of maximum size, according to the present invention.

In the preferred form described this general principle has been applied to apparatus of the continuous type in which the juice and reagents pass through an agitator and into a continuous sedimentation apparatus of well known type. The combination of flocculation control and continuous operation is especially valuable in providing apparatus of maximum capacity and efficiency in a given space.

Figure 2:
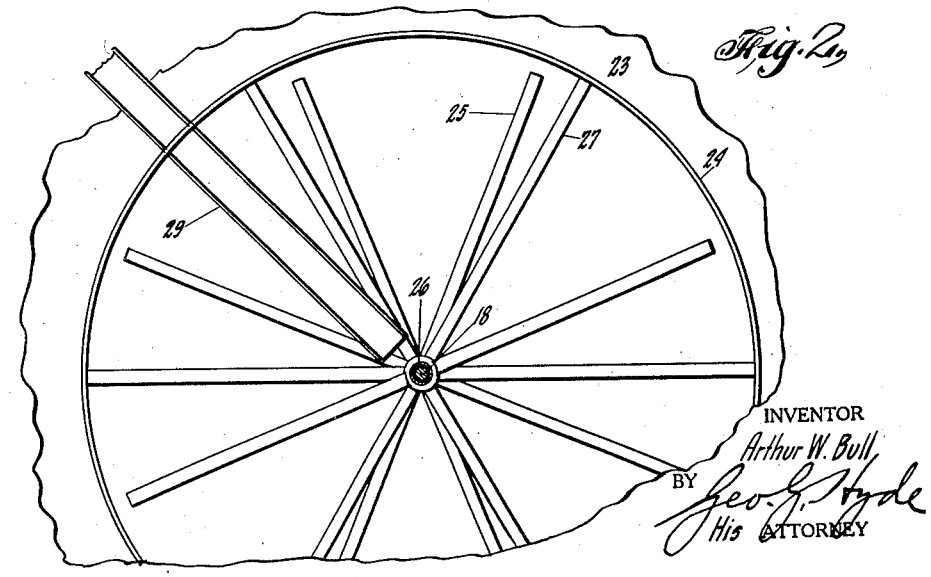

Other objects and advantages of the invention will be apparent from the following description taken in connection with the accompanying drawings, in which Fig. 1 is a vertical central section through a suitable form of apparatus, and Fig. 2 is a fragmentary plan view of the agitator portion thereof.

The apparatus comprises a settling tank 10 divided by transverse trays 11 into a plurality of superposed settling compartments 12 each provided with overflow or decantation pipes 13 having inlet sections 14 and outlet sections 15 passing through the walls of tank 10 and into overflow box 16 in well known manner as employed in the standard Dorr clarifier. The solids settling on each tray and on the bottom of the tank 10 may be propelled to the center by revolving rake arms 17 carried by shaft 18, and dropped through central openings in the bottom of each compartment, the openings connecting with the aligned downwardly extending cylindrical boots 19. The solids settling in the bottom compartment are withdrawn through the central discharge opening 20 through pipe 21 connecting with pump 22.

The agitator for the feed comprising the juice with defecating agents may be located directly above the center of the settling apparatus, and preferably is mounted directly on the top 23 of the uppermost compartment. The agitator, which should be of the paddle type, comprises a cylindrical wall 24, tightly joined to the top 23, which forms the bottom of the agitator. A plurality of agitating paddles 25 are suitably mounted for rotation in the agitator, as by mounting them on a quill shaft 26 surrounding the rake shaft 18, both shafts being driven by suitable mechanism not shown. The paddles 25 are preferably offset angularly around the shaft, and baffle strips 27 extend across the tank between the paddles, preferably also being angularly staggered for purposes hereinafter indicated. The baffles 27 are mounted in fixed position on the wall 24 and loosely surround shaft 26.

The feed is introduced through a suitable pipe 28, and scum launder 29 extends radially across the agitator with its edge just above the liquid level in the agitation compartment and passing through the wall 24 for discharge of scum and floating matter.

Means may be provided for returning to the feed a portion of the settled solids or mud, as by providing the pump 22 with a discharge pipe 30 having a normal mud outlet 31 and a return pipe 32 extending into the agitator tank 24 and controlled by a valve 33 for regulating the proportion of mud to be returned.

In operation the shaft 18 is rotated at a relatively low speed as is usual with apparatus of this type, while the shaft 26 revolves at a somewhat higher speed, such speed being regulated in accordance with local conditions so that the flocs formed in the agitator are of maximum size, as can readily be determined by observation. The offset position of both paddles and baffles avoids excessive local disturbances due to paddles passing between adjacent aligned baffles, and at the same time prevents any substantial swirling such as would interfere with efficiency in maintaining the flocs in suspension. It should be understood however that other types of agitator may also be employed for the purpose, provided they are suitably regulated in the manner indicated for preservation of the floc size and uniform distribution throughout the juice.

The agitator is of sufficient size to assure the complete concentration of settleable solids in the form of flocs, and also to permit all floatable matter to rise to the surface or be entrained in the flocs. As floating matter accumulates it will be swept into launder 29 by the rotation of the adjacent paddle 25 located near the surface, producing a slight surface swirl or wave.

The feed is continuously introduced through pipe 28 and begins to flocculate in the uppermost portion of the agitator, the flocculation becoming more complete as the liquid descends, until it is completely flocculated and all settleable solids are absorbed in the flocs by the time the plate 23 forming the bottom of the agitator is reached. The mixture then passes downwardly through the boot 19$^a$ and into the settling compartments in accordance with standard practice.

The same process is of course employed in beet sugar manufacture, being applicable particularly to the treatment of the juice after liming and carbonation, as well as after other defecating steps which are sometimes employed and are well known to those skilled in the art.

The proper rate of agitation to accomplish the objects of this invention, particularly the formation of adequate flocs and the avoidance of their destruction by the agitator, is a matter for engineering determination, dependent upon the precise type of agitator employed, the nature of the sugar-bearing fluid treated and conditions of operation, including particularly dilution and temperature. For the treatment of cane juice from the rolls after the usual chemical treatment and heating, a detention period of from fifteen minutes to an hour will generally be required, periods of from twenty to forty-five minutes being usually adequate under average conditions. Where a paddle agitator is employed an average speed of the paddles relative to the enveloping liquid of approximately one foot per second has been found suitable under such conditions.

For convenience the claims refer to the treatment of juice; but this expression is intended to include all sugar bearing liquids, such as sweet waters and the like.

I claim:

1. In a process of manufacturing sugar in which the sugar bearing juice is treated to precipitate impurities, the step which comprises agitation of the treated juice for a period sufficient to obtain substantially complete flocculation and at a rate adequate to maintain a substantially uniform suspension of all flocs but insufficient to prevent the formation and maintenance of flocs of substantially maximum size.

2. In a process of manufacturing sugar in which the sugar bearing juice is treated to precipitate impurities, the step which comprises the continuous preparation of the treated juice for sedimentation by agitating a continuously flowing stream of juice during a detention period between the influx and the discharge of the juice sufficient to obtain substantially complete flocculation in the effluent and at a rate adequate to maintain a substantially uniform suspension of all flocs in all portions of the juice which have been subjected to the agitation for substantially the same period of time, but insufficient to prevent the formation and maintenance of flocs of substantially maximum size in any part of the juice undergoing continuous agitation.

3. Improvements in a process of manufacturing sugar as set forth in claim 2 in which the juice is discharged continuously after agitation into a sedimentation apparatus adapted to discharge continuously supernatant clear juice.

4. In a process of manufacturing sugar in which the sugar bearing juice is treated to precipitate impurities, the steps comprising agitation of the treated juice for a period sufficient to obtain substantially complete flocculation at a rate adequate to maintain a substantially uniform suspension of settleable solids including flocs but not sufficient to prevent the formation and maintenance of effective flocs; removal of the settleable solids from the juice after such agitation; and the return of solids thus removed to juice subsequently undergoing a similar agitation step.

5. In a process of manufacturing sugar in which the sugar bearing juice is treated to precipitate impurities, the steps which comprise agitation of a continuously flowing stream of juice for a period between influx and discharge sufficient to obtain substantially complete flocculation and at a rate adequate to maintain a substantially uniform suspension of settleable solids including flocs in all parts of the juice which have been subjected to agitation for the same period of time, but insufficient to prevent the formation and maintenance of effective flocs; removing the settleable solids continuously from the agitated juice; and returning continuously to the beginning of the agitation step solids thus removed.

6. In a process of manufacturing sugar in which the sugar bearing juice is treated to precipitate impurities, the step which comprises subjecting the treated juice to agitation without imparting swirling motion to the body of juice, and for a period sufficient to obtain substantially complete flocculation and at a rate adequate to maintain a substantially uniform suspension of settleable solids but insufficient to prevent the formation and maintenance of effective flocs.

In testimony whereof I affix my signature.

ARTHUR W. BULL.